United States Patent [19]

Contreras

[11] Patent Number: 4,998,648
[45] Date of Patent: Mar. 12, 1991

[54] COFFEE DISPENSER
[76] Inventor: Orlando Contreras, 9301 NW. 36 Ave., Miami, Fla. 33147
[21] Appl. No.: 384,629
[22] Filed: Jul. 25, 1989
[51] Int. Cl.⁵ .............................................. G01F 11/10
[52] U.S. Cl. .................................... 222/370; 222/558; 141/320; 141/364
[58] Field of Search ............... 222/368, 370, 556, 567, 222/342, 548, 477, 558; 141/22, 312, 322, 386, 320, 321, 366, 363, 364, 365

[56]  References Cited
U.S. PATENT DOCUMENTS

| 762,198 | 6/1904 | Rosser | 222/558 |
|---|---|---|---|
| 1,088,633 | 2/1914 | Simmons et al. | 141/312 |
| 1,394,210 | 10/1921 | Miller | 222/368 X |
| 2,190,111 | 2/1940 | Zellers | 222/368 |
| 2,537,545 | 1/1951 | Patterson | 222/368 X |
| 2,545,350 | 3/1951 | Fuld | 222/567 X |
| 2,978,146 | 4/1961 | Packwood, Jr. | 222/342 X |
| 2,989,093 | 6/1961 | Stiebel | 141/386 X |
| 4,189,066 | 2/1980 | Berghahn | 222/368 X |
| 4,257,541 | 3/1981 | Souza | |
| 4,394,940 | 7/1983 | Peterson | |
| 4,557,404 | 12/1985 | Solomon | 222/342 X |
| 4,674,657 | 6/1987 | Daniels | 222/146.5 X |

Primary Examiner—Andres Kashnikow
Assistant Examiner—Gregory L. Huson
Attorney, Agent, or Firm—J. Sanchelima

[57] ABSTRACT

A device for dispensing predetermined equal amounts of coffee into the reservoirs mounted to the upper termination of the lower detachable portion of an expresso coffee pot. The device is adapted to securely receive the open end of a cylindrical coffee container on one end and the other end has several concentric recesses that cooperatively receive the upper termination. A dispensing member with hemispheric shape is rotably mounted within the device to cover the opening of the smaller one of the concentric recesses with the convex side and capable of dispensing a predetermined amount of coffee when rotated with an externally accessible handle member.

2 Claims, 2 Drawing Sheets

COFFEE DISPENSER

BACKGROUND OF THE INVENTION

1. Field of the Invention.

The present invention relates to coffee dispensers, and more particularly, to such dispensers for expresso coffee pots.

2. Description of the Related Art.

A number of mechanisms have been designed in the past for dispensing granular materials. See for example, U.S. Pat. Nos. 4,394,940 issued to Peterson where one of such dispensers is disclosed that uses rotatable plates. Also, U.S. Pat. No. 4,257,541 issued to Souza shows a cup-like housing and a dispensing member disposed therein. However, none of these attempts work with express coffee pots and the structural characteristics of these designs are structurally different from the teachings of this invention.

Other patents describing the closet subject matter provide for a number of more or less complicated features that fail to solve the problem in an efficient and economical way. None of these patents suggest the novel features of the present invention.

SUMMARY OF THE INVENTION

It is one of the main objects of the present invention to provide a dispenser for expresso coffee pots of the type that use a conical shaped filter to hold the coffee.

It is another object of the present invention to provide such a dispenser that dispenses uniform amounts of coffee and that is compatible with the different commercially available expresso coffee pots.

It is yet another object of this invention to provide such a device that is inexpensive to manufacture and maintain while retaining its effectiveness.

Further objects of the invention will be brought out in the following part of the specifications, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
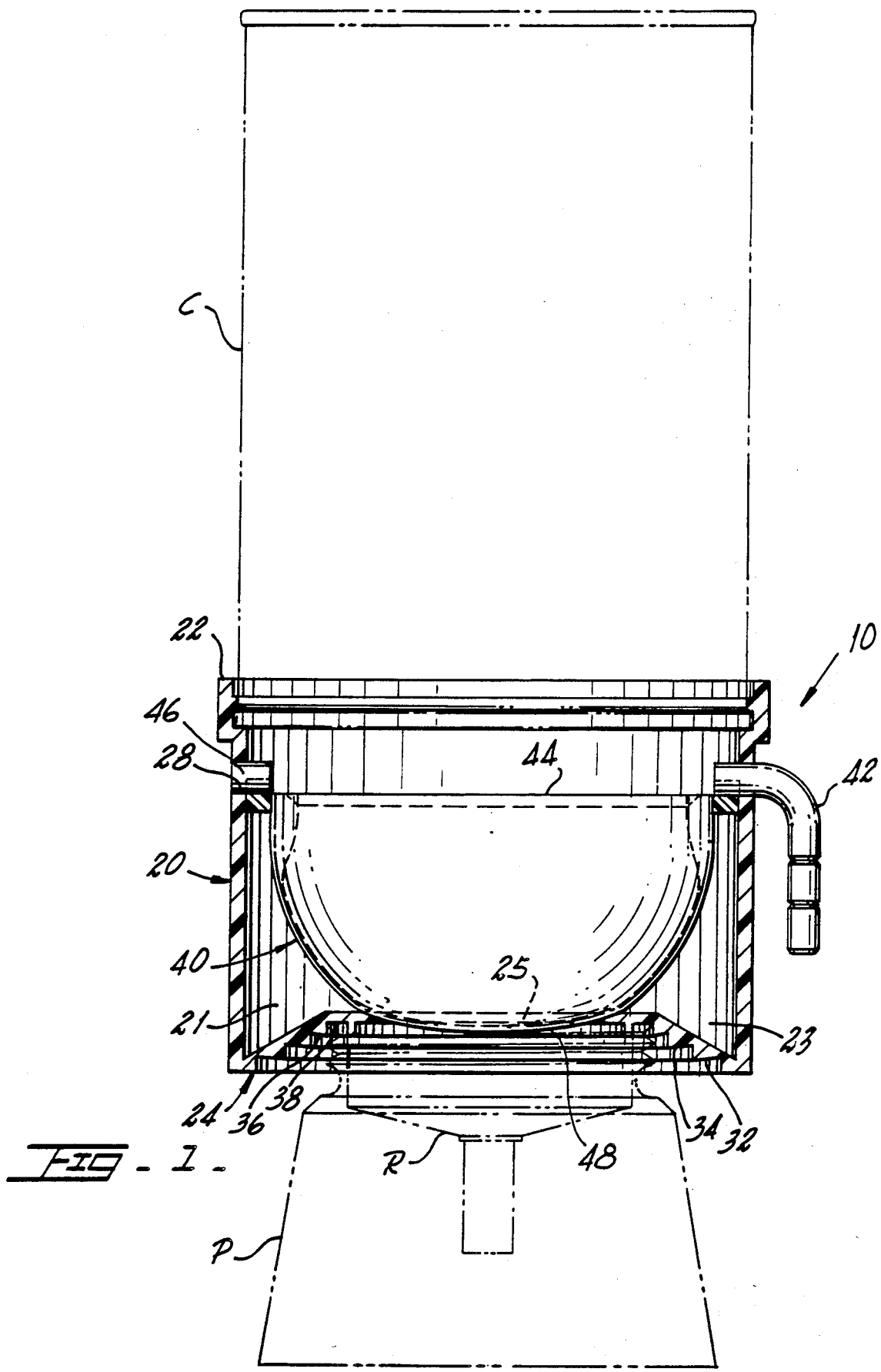
FIG. 1 represents is cross-sectional view of the present invention mounted over the lower half of a conventional expresso coffee pot.

Referring now to FIG. 1, where the present invention is generally referred to with numeral 10, it can be observed that it basically includes a cylindrical housing 20 with an upper end 22 that is open and of a diameter that is compatible with the diameter of expresso coffee containers C now in the market. The lower end 24 of cylindrical housing 20 includes several inwardly conveying concentric recesses 32; 34; 36 and 38 having diameters that cooperatively engage with standard diameters of the rims of expresso coffee pots P. Conventionally, expresso coffee pots P have a reservoir R that is filled with expresso coffee granular material and the water below it is heated and forced up thereby percolating the coffee in reservoir R. Therefore, reservoir R needs to be filled with coffee and it is the objective of this invention to provide a device that dispenses uniform amounts of coffee rapidly in reservoir R.

Dispensing unit 40 has substantially the shape of a cup and includes handle member 42 on one end of rim 44 and opposite thereto there is a pivoting protrusion 46 that is journaled by opening 28 in housing 20. The concave portion of dispensing unit 40 faces upwardly, as best seen in FIG. 1, to receive a predetermined amount of coffee. When handle member 42 is rotated, causing dispensing unit 40 to rotate, the coffee is deposited in reservoir R that is a standard component of pots P. When dispensing unit 40 is in a position wherein the convex portion is up, reservoir R is completely covered with coffee including the adjoining lower areas 21 and 23 of housing 20. As the user continues to rotate dispensing unit 40, its rim 44 shaves or scoops off the excess returning to its initial position as shown in FIG. 1. In this manner, a predetermined sufficient amount of coffee is always deposited in reservoir R insuring repeatability and avoiding wasting coffee.

Figure 2:
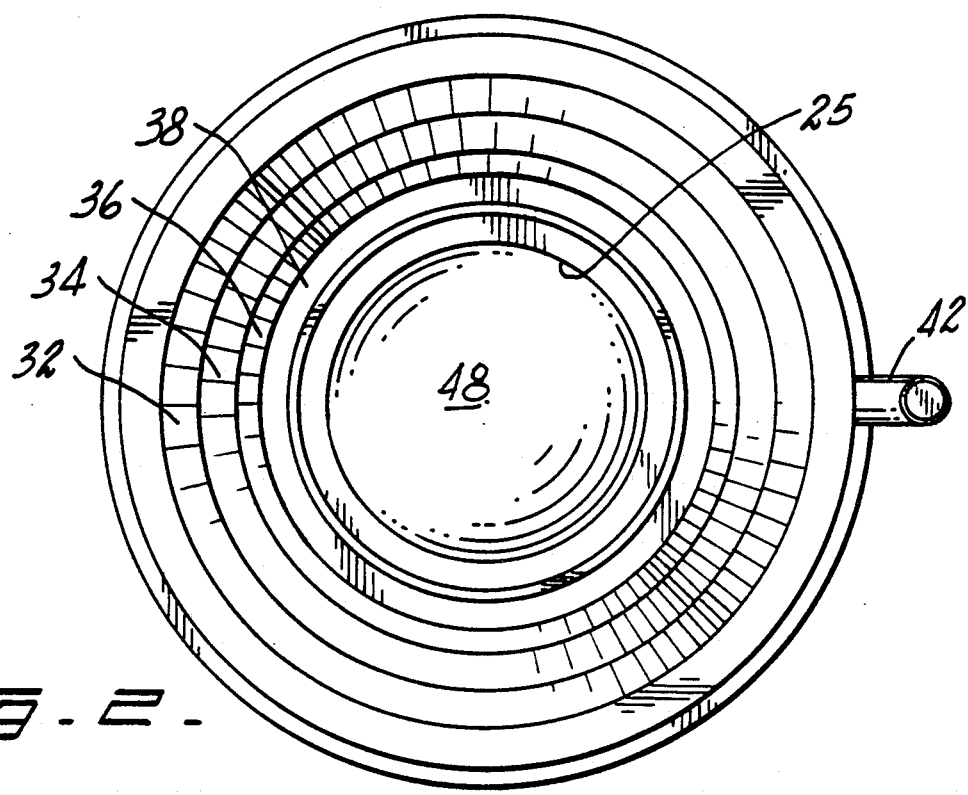
FIG. 2 shows a bottom view of the cylindrical housing used in the present invention.

In FIG. 2, a bottom view of cylindrical housing 20 shows the concentric recesses and central opening 25 through which the coffee passes. Convex side 48 of unit 40 shows through opening 25.

Figure 3:
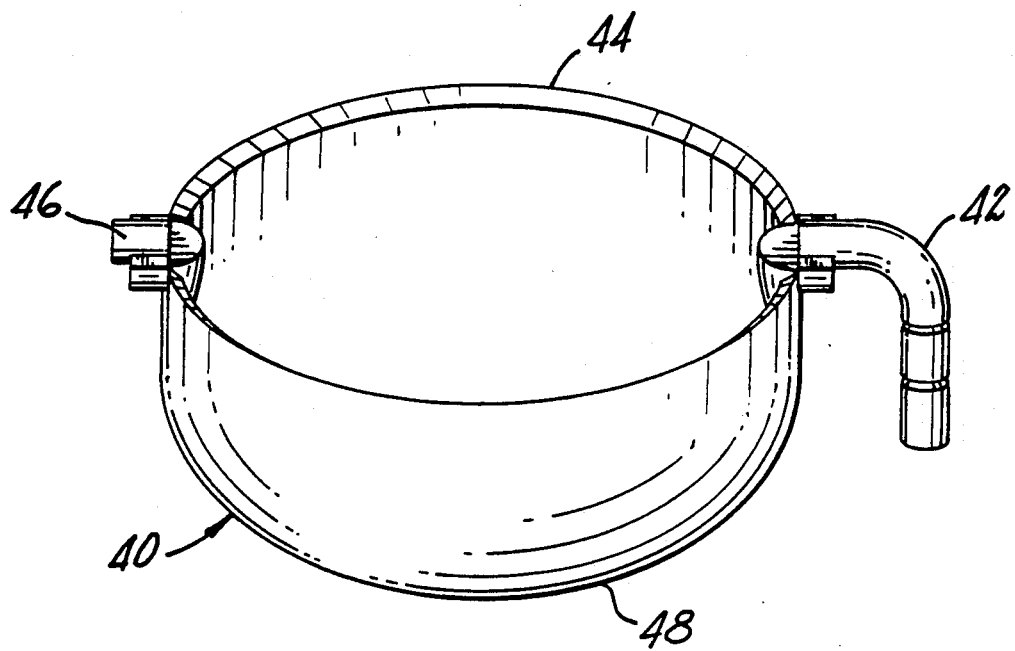
FIG. 3 illustrates the dispensing cup member used in this invention.

In FIG. 3, an oblique view of dispensing unit 40 shows a preferred manner of positioning handle member 42 and pivoting protrusion 46.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a liming sense.

What is claimed is:

1. A coffee dispensing device to be used in conjunction with express coffee pots of the type that include a detachable lower portion having an upper open termination to which a coffee reservoir is mounted and housed within said lower portion and said coffee dispensing device is also used in conjunction with cylindrical coffee containers having one open end, comprising:

A. housing means having an upper and a lower end and wherein said upper end is open and has a sufficiently large diameter to cooperatively receive said open end of said coffee container and said lower end of said housing means including a plurality of inwardly converging concentric recesses wherein one of said recesses cooperatively engages with said upper open termination of said lower portion; and B. coffee dispensing means pivotally mounted within said housing means having substantially a hemispheric shape with concave and convex sides wherein said convex side is positioned over said concentric recesses so that the opening of the smallest of said concentric recesses is covered by and in contact with said convex side and said coffee dispensing means further includes handle means for rotating said coffee dispensing means to unseat said convex side from said concentric recess thereby said coffee reservoir receives said coffee and the excess is shaved off with said coffee dispensing means as it is rotated to return said convex side into contact with said concentric recess.

2. The device set forth in claim 1 wherein said coffee dispensing means includes a rim and said handle means is positioned on one end of said rim and the diametrically opposite other end of said rim having a pivoting member outwardly protruding through said housing means and said housing means includes cooperating openings for receiving said pivoting member and said handle means.

* * * * *